Jan. 12, 1965   A. E. R. ARNOT   3,164,985
FUEL METERS
Filed July 3, 1961   3 Sheets-Sheet 1

INVENTOR :-

Jan. 12, 1965  A. E. R. ARNOT  3,164,985
FUEL METERS
Filed July 3, 1961  3 Sheets-Sheet 2
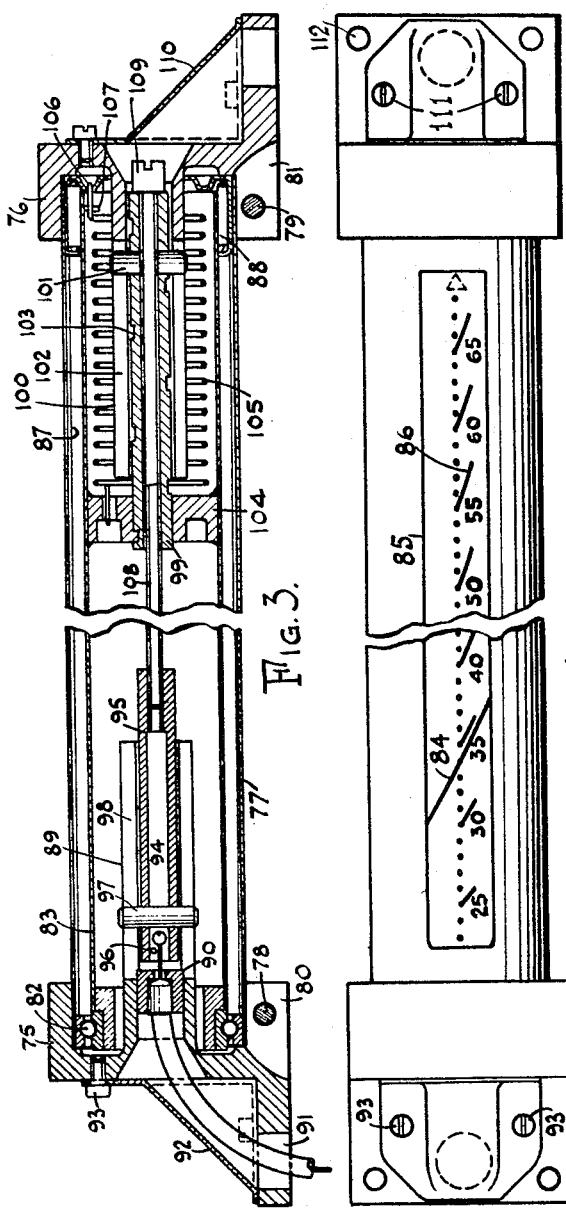
INVENTOR:-
Alfred E. R. Arnot

INVENTOR:-

United States Patent Office 3,164,985
Patented Jan. 12, 1965

3,164,985
FUEL METERS
Alfred Erwin Reginald Arnot, Baughurst,
Basingstoke, England
Filed July 3, 1961, Ser. No. 121,683
Claims priority, application Great Britain July 6, 1960
5 Claims. (Cl. 73—114)

This invention comprises improvements in or relating to fuel meters, more particularly in connection with the measurement or indication of fuel consumption of internal combustion engines.

It is an object of the invention to provide means to determine the fuel consumption of an internal combustion engine installation in relation to an output condition substantially contemporaneously.

It is a further object to provide a convenient and compact form of indicator therefor.

Such a device may be used for instance to give a continuous indication of the consumption in miles per gallon of a motor vehicle; knots per ton of a ship; gallons per horsepower hour or per kilowatt hour of a power unit or generator set; or the efficiency of the whole or part of an engine driven installation; or signal by audible or visible means the attainment of or departure from defined limits of performance; or by control means initiate action such as super-charging, fuel constituent change, driving gear ratio variation, load shedding and the like.

According to the invention there are provided fuel delivery means driven at a rate proportional to an engine output condition; balancing means adapted to control the delivery means output so that it is equal to the engine consumption; and indicating, recording or controlling means responsive to the action of said delivery control means.

The fuel delivery means may comprise a pump, or metering means supplied from a pressure source, having an output related to the rate of drive; the drive may be from a road wheel connected source such as a speedometer cable so that the output condition is distance traveled; or a pumping set drive shaft so that the output condition is liquid delivery; or a trawled screw so that the output condition is knots travelled; or from an engine connected shaft through a variable ratio gear, such as a disc between axially offset parallel plate wheels radially displaced by the movement of torsion-resisting springs in the engine or load mountings so that the drive output is the product of engine speed and torque, and the output condition is horsepower; or from a watt-hour meter or servo motor responsive thereto actuated by the output of a generator set so that the output condition is kilowatt-hours; or similar drive means according to the usage of the installation.

Control of the fuel delivery means may be by any of the variable delivery pump means known in the art, such as swash plate pivotting, displacement of circumscribing piston track, or lateral displacement of a conical eccentric; or by control of piston travel by variable abutment means such as wedge or cam or lever or slidable stop; or by valve control means to modify intake or discharge displacement; or by speed ratio varying means in the drive to pump or metering means.

Balancing means for said control may comprise spring loading means biasing the delivery means to maximum delivery, and counteracted by a piston subject to the pressure of excess delivery; or float means in a tank or tube connected to the delivery supply, and arranged to reduce the delivery as the level rises or increase delivery as it falls by mechanical or electrical control; or manual means regulatable to maintain a constant fuel level in a sight glass; or any other means adapted to use excess or inadequate delivery to reduce or increase said delivery.

Indicator means are provided to determine the balancing position of the delivery control, which directly represents the fuel output per operation of the pump or meter and hence proportionately the engine fuel consumption per revolution of a road wheel or the work done per revolution of the engine shaft or the watts generated per revolution of the engine or the like according to the output condition chosen. The indicator means may be mounted on the delivery means and comprise a pointer driven by rack or segment and pinion over a scale calibrated in units of performance or efficiency; or may be remotely situated and actuated by electrical, mechanical or hydraulic remote control or repeater means or may be a recording stylus traversing a moving scale; or by operating switches, valves or mechanisms associated with the delivery control means may indicate the attainment of or departure from positions or ranges of operation representing desirable or undesirable conditions of efficiency by visible or audible means, or may be connected to control members of the engine installation to maintain as far as possible the most favourable running conditions.

Additional fuel supply means may also be introduced to maintain running of the engine when the output condition being measured falls to zero and the delivery pump or meter ceases to operate, as by the stopping of a vehicle or by switching off a generator load or disengaging a drive torque. The additional supply may be provided by a separate pump or pressure source or by a differential gear introducing a separate drive into the fuel delivery means of the device, such supply or drive being controlled to become effective when the fuel delivery of the device has become inadequate to maintain engine running.

Pressure relief means may also be provided to prevent excessive delivery of fuel in the event of malfunctioning of the delivery control means, and such pressure relief means may act to return excess fuel to a supply system, or displace or bypass valve in the fuel delivery means to prevent or reduce pumping action.

The following is a description by way of example of one construction of a miles-per-gallon meter for motor vehicles according to the invention, reference being made to the accompanying drawings in which:

FIGURE 3 is a sectional elevation of a calibrated measuring meter on the plane CC. of FIGURE 4.

FIGURE 4 is a plan view of the meter shown in FIGURE 3.

Figures 1, 2:
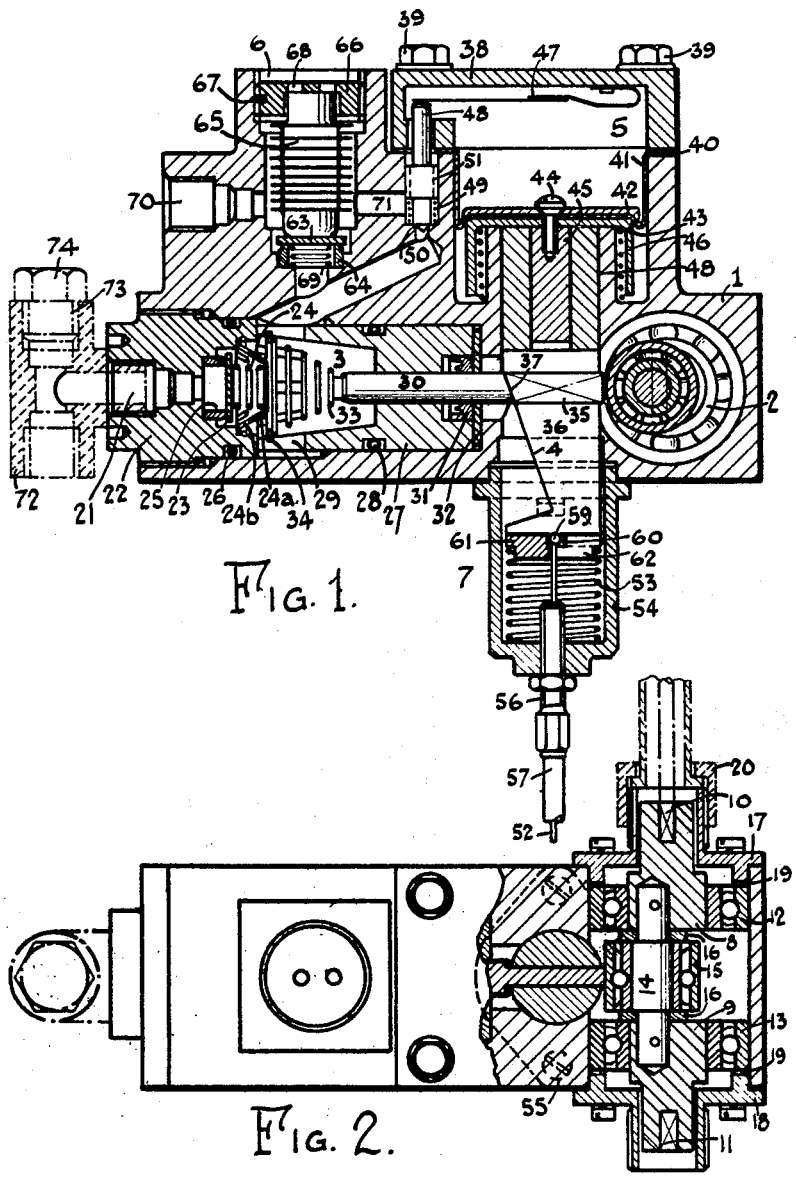
FIGURE 1 is an elevation of a fuel delivery pump cross-sectioned on the plane AA. shown in FIGURE 2.
FIGURE 2 is a plan of the pump shown in FIGURE 1 partly cross-sectioned on the plane BB. shown in FIGURE 1.

Referring first to FIGURE 1, the pump comprises a diecast body 1; an eccentric drive assembly 2; a piston pump assembly 3; pump delivery control wedge 4; balancing piston assembly 5 shown in the fully extended position; pressure relief assembly 6; and indicator operating cable assembly 7.

The eccentric drive assembly 2 is arranged to be interposed in the speedometer drive cable of a motor vehicle, and comprises a composite shaft having ends 8, 9 with sockets 10, 11 to receive drive cable terminations, carried in lubricated sealed ball bearings 12, 13 housed in the body 1, and connected by a press-fitted and pinned eccentric shaft 14 carrying a piston-engaging lubricated sealed ball bearing 15 between spacing washers 16. End caps 17, 18 serve to locate the assembly with shims 19 and provide screwed attachments for the drive cable housing ends 20.

The piston pump assembly 3 comprises a fuel inlet connection 21 in a screwed plug 22, carrying a flat disc inlet valve 23 lightly loaded by a spring 24 under a pierced retaining cap 24a with serrated edges 24b onto a seating 25, and fitted with an external sealing ring 26. A concentrically mounted bronze cylinder 27 fitted with an external sealing ring 28 and circumferentially slotted abutment end 29 is provided with a polished piston 30 passing through a seal 31 and supporting backing washer 32 and urged into engagement with eccentric bearing 15 by a spring 33 seated against a spring ring 34 in the cylinder 27. Beyond the seal 31 the piston 30 is tongued at 35 to pass through a slot 36 in the wedge member 4, leaving abutting faces 37 to be stopped against the wedge face.

The piston assembly comprising the cylinder 27, piston 30, spring 33, seal 28, ring 34, seal 31 and backing washer 32 may be extracted by removing plug 22, and may be replaced by a similar assembly with a diameter of piston to suit a particular engine capacity. The eccentric throw of the bearing 15 multiplied by the cross-sectional area of the piston 30 is chosen to pump slightly more fuel in a full stroke than the maximum requirement of the engine per revolution of the drive cable socket 10. Thus in the example illustrated, the eccentricity is 1/4" and the piston diameter is 1/4", so that the maximum displacement is .01225 cu. ins./rev. of the input shaft. In conjunction with a standard speedometer gearing of 1000 revolutions per mile, the maximum displacement of fuel is 12.25 cu. ins. per mile, or .0442 Imperial gallons per mile, or inversely 22.6 miles per Imperial gallon. The pump shown is therefore suitable for a vehicle having a maximum consumption in the most uneconomic driving condition of some 25 miles per gallon. Alternative piston assemblies to fit into the same body may be chosen to suit a particular vehicle, or comprise a standard range such as 0.177" diameter piston for a maximum consumption of 50 miles per gallon such as may be found suitable for a motorcycle application, 0.354" diameter for a maximum consumption of 12.5 miles per gallon, and 0.500" diameter for a maximum consumption of 6.25 miles per gallon. Greater consumption requirements are more conveniently supplied from a similar but larged unit.

The balancing piston assembly comprises a cylindrical chamber 5 with a rectangular cover 38 held by bolts 39, and which clamps to the body 1 the flange 40 of a flexible rolling diaphragm 41 whose centre is held between a cover plate 42 and flanged former 43, the assembly being attached by a domed screw 44 to a centralising plunger 45. A spring 46 urges the piston assembly upwardly so that in the rest position the head of screw 44 lifts the spring leaf assembly 47 off the end of valve stem 48, allowing spring 49 to lift valve 48 and permit free fluid flow past the seating 50. Flats 51 on the guide portion of the valve stem 48 allow fuel to communicate with the chamber 5, and press the diaphragm 41 downwards against the spring 46, carrying with it the wedge member 4 in which the plunger 45 is slidably centralised. A disc 61 supporting the wedge member 4 is separately urged upwardly against the action of the diaphragm 41 and the pull of an indicator-operating cable 52 by a spring 53 in a detachable housing 54 held in position by screws 55, and provided with an adjustable abutment 56 for the outer conduit 57 of the cable 52. The cable 52 terminates in a ball end nipple 59 carried in a central hole 60 in disc 61 to which it is introduced by passing the cable through a slot 62.

The wedge member 4 comprises a polished circular shaft slidably mounted in a hole 58 in the body 1; the upper end carries the diaphragm assembly 41; the lower end is set against the disc 61; the lower trunk is slotted at 36 to allow the tongue 35 of the piston 30 to pass through it; and an inclined face 4 is provided to act as a stop against the shoulders 37 of the piston 30 so that in the full downward travel of the diaphragm 41 the return travel of the piston 30 may be reduced from full displacement by the eccentric to zero.

A pump output valve comprises a flat disc 63 on a seating 64, against which it is held by metal bellows 65 adjustably compressible by a screwed cap 66 having a plastic locking insert 67. The interior of the bellows 65 communicates with atmosphere through vent holes 68, so that in conditions of excess pressure the bellows will compress and allow the outlet valve disc 63 to be lifted from its seating by the light spring 69, thus preventing further cumulative pumping. A fuel outlet connection 70 is connected to the carburetor inlet of the engine, and it connected also through bore 71 to a communication past valve flats 51 with the balancing chamber 5.

The measuring meter shown in FIGURES 3 and 4 is intended for convenient mounting as an accessory in existing vehicles, and is therefore made suitable for mounting on a panel in a restricted area. It comprises two end brackets 75, 76 clamped to the ends of a spacing tube 77 by pinch bolts 78, 79 acting across slots 80, 81 in the base of the brackets. Within the tube 77 a ball bearing 82 carries one end of a cylinder 83 on which is marked a calibration curve 84, seen through a slot 85 in the tube 77 and underlying a scale 86 on a transparent plastic tube 87. The other end of cylinder 83 is carried in a needle roller bearing 88 within the tube 77.

A hollow shaft 89 projecting from the centre of bracket 75 is provided with an inner abutment 90 to receive the cable conduit 57 from the fuel delivery pump unit. The conduit passes through a hole 91 in the mounting base of the bracket and a corresponding hole in the vehicle panel, and is outwardly concealed by a pressing 92 held in position by screws 93. A nipple on the end of the cable 52 is located in a hole 94 in the end of a rod 95 by a transverse pin 96, and a guide pin 97 pressed through rod 95 slidably engages a slot 98 in the shaft 89. The bracket 76, which is substantially similar to bracket 75, carries a rod 99 slidably mounted in a hollow shaft 100 and fitted with a pressed-through guide pin 101 slidable in the slot 102. A helical thread 103 on the rod 99 passes through a disc nut 104 cemented into the cylinder 83, and a wound-up helical spring 105 engages the disc 104 and a tag 106 on the outer shell of bearing 88. A bent-down tag 107 on the rim of cylinder 83 limits unwinding of the spring 105.

A threaded rod 108 with a slotted head 109 passes through an axial hole in rod 99 and is screwed into a tapped hole in the rod 95. The adjusting head 109 is accessible beneath a pressing 110 held in place by screws 111.

The brackets 75, 76 are freely removable from the ends of tube 77 by loosening screws 78, 79, and unscrewing rod 108, the tube assembly remaining an undisturbed unit. In this condition the cable 52 is readily assembled into the bracket 75 and rod 95.

The unit is mounted in a horizontal position just below the windscreen by screws 112. Before tightening the clamping screws 78, 79 the tube 77 is rotated until the slot 85 is squarely facing the driver.

In operation the spring 105 acting on the nut 104 is pre-wound to draw the cable 52 against the stronger spring 53 under the wedge 4 in the pump unit. Hence as the wedge descends the cable is drawn out and the nut 104 rotates, carrying the cylinder 83, and on it the curve 84, past the scale 86. The helix 103 is chosen to give slightly less than one revolution of the nut in the full travel of the wedge 4, so that a pitch of 13/16" and wedge travel of 3/4" will rotate the cylinder 83 through 330°.

Figure 5:
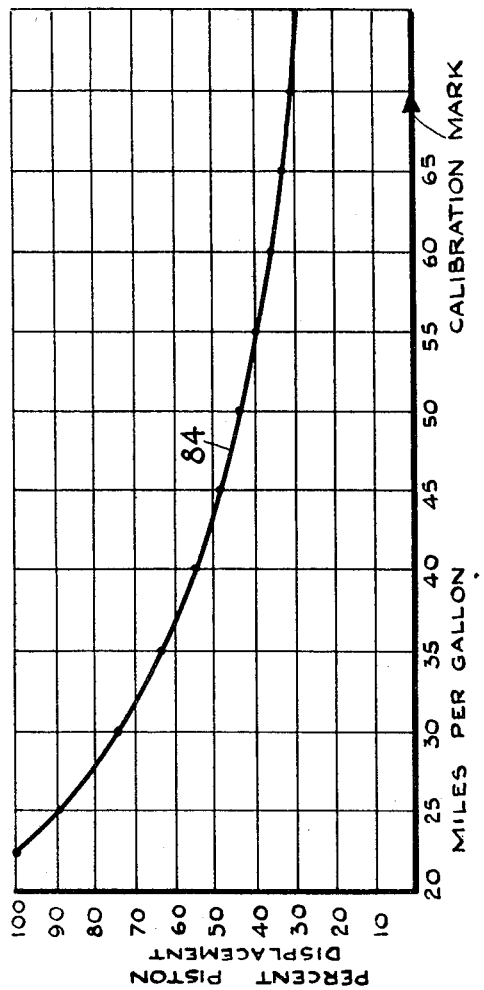
FIGURE 5 is a development of the calibrating scale used in the meter shown in FIGURE 3.

The preparation of the curve 84 is shown in FIGURE 5. The vertical axis is the development of the rotation of cylinder 83, and is scaled to show the travel of wedge 4 and hence the displacement of piston 30. Thus at 100% displacement the output of the 1/4" piston assembly at 1000 operations per mile has previously been shown to be 22.6 miles per gallon; similarly at 90% displacement the consumption is 25.1 miles per gallon; at 80% it is 28.2 miles per gallon; and finally at 0 displacement it is infinite, for example by coasting downhill with the engine switched off.

For the horizontal axis a convenient range of consumption is chosen based on the maximum output of the piston assembly to be used, the embodiment illustrated being suitable for a vehicle having a nominal consumption of some 35 miles per gallon. The consumption figures are evenly distributed or relatively scale-widened as desired across the width of the slot 85, and a curve 84 is plotted connecting them with the equivalent piston displacement on the ordinate. At the end of the scale a discontinuity will exist if a finite scale range has been chosen as shown, and a calibration mark in the form of an arrow on the zero displacement line of the ordinate is required for initial setting and subsequent checking of the meter as will hereinafter be described.

Interchangeable scaled tubes 87 are made available with calibrated scales 86 to operate in conjunction with the interchangeable piston assemblies 3 which may be fitted to the pump unit.

The cylinder 83 may be made of translucent plastic, and the interior or scale 86 may be illuminated by lamp means conveniently positioned under the pressings 92 and 110 and cooperating with suitable apertures in the brackets 75, 76.

The apparatus is installed in the vehicle so that the vehicle fuel pump output is connected to inlet 21 through a three-way connector 72 having one port 73 closed by a plug 74 of the same size as the pump outlet 70, and the outlet 70 returns to the carburettor. The speedometer drive cable, or a more robust replacement, is connected from the conventional transmission take-off to socket 10; and an extension cable is connected from socket 11 to the speedometer, which thus has continuity of drive.

In the starting position the diaphragm 41 is in its uppermost position, lifting spring 47. Fuel from the vehicle pump therefore passes the light intake valve 23, the open valve seating 50, and the cross bore 71 to reach the carburettor through outlet 70. No rotation of the eccentric occurs whilst the vehicle is stationary, and no further action of the apparatus is involved.

As soon as the vehicle is put into motion, the eccentric bearing 15 rotates and imparts maximum travel to the piston 30, thereby displacing more fuel than the engine can require per operation as previously described. The excess fluid pumped accumulates in the chamber 5, first moving the diaphragm 41 so that the spring 47 closes valve 48 onto seat 50 to prevent further fuel passing from the vehicle pump and then depressing the piston travel reducing wedge 4 until the amount of fuel displaced through the output valve 63 in each stroke is exactly equal to the amount of fuel consumed by the engine in the same cycle.

In this condition the stroke of the piston is a measure of the fuel used by the engine to propel the vehicle for a distance corresponding to one revolution of the speedometer cable, or generally 1/1000 mile; but the stroke of the piston is related to the position of the wedge by the slope of the surface 4, so that the position of the wedge is a measure of the fuel used in a given distance, or inversely related to the distance given by a measure of fuel.

In the event of stiction of the wedge or cable assembly over-riding features are incorporated. If delivery is inadequate, fuel from chamber 5 is urged to the outlet 70 by the spring 46 under the diaphragm 41, which thus rises on its centralising plunger 45 until the screw 44 lifts the spring 47 and again allows the vehicle pump output to flow past seating 50. If the delivery is excessive, the resultant pressure rise will compress bellows 65 and allow fuel to oscillate past valve 63 without a cumulative pumping effect.

In order to achieve the desired working of the parts, the pressure relationships governed by some of the springs are of importance. Thus in a vehicle fitted with a carburettor suitable for an inlet pressure of 3 to 4 lbs. per sq. in. and a vehicle fuel pump with a maximum output pressure of 4 lbs. per sq. in., the inlet valve spring 24 may be made equivalent to a back pressure of 0.5 lbs. per sq. in. on the area of the valve seat 25. The sum of springs 46 and 53, less the tension effect on the cable 52 of coiled spring 105 in the meter should balance a pressure of 3 lbs. per sq. in. on the area of diaphragm 41 when screw 44 is just free of spring 47, and a pressure of 4 lbs. per sq. in. when almost fully depressed; the force contributed by spring 46 must be sufficient to lift spring 47 by itself in the event of wedge stiction. Spring 49 requires only to lift the weight of valve stem 48, and the effect of spring 47 on the top of valve 48 must seat the valve onto the area of its seating 50 to prevent the passage of fuel at the maximum pressure in the pump cylinder determined by the loading of the output valve 63. The bellows 65 is chosen to have an effective area approximately twice the area of valve seat 64, and is screwed down by the adjusting ring 66 so that it will just allow the disc 63 to be lifted off its seating 64 by the spring 69 when it is surrounded by a pressure of 5 lbs. per sq. in. This is equivalent to a seating pressure of 10 lbs. per sq. in. on the disc 63, which thus ensures that the vehicle pump pressure of 4 lbs. per sq. in. cannot pass through this port unless it is pumped by the measuring piston 30.

With these characteristics it will be seen that when the vehicle is stationary with the engine running, fuel from the vehicle pump will enter inlet 21 at 4 lbs. per sq. in. and pass the valve 25 with a reduction to 3.5 lbs. per sq. in. Thence it will pass the open valve seat 50 and distribute itself to outlet 70 and to chamber 5 where it will commence to depress the diaphragm 41; a very small movement of the diaphragm will reduce the force between screw 44 and spring 47 so that valve 48 rests on seating 50 to become a pressure reducing valve to drop the 3.5 lbs. per sq. in. which has passed valve 25 to the 3 lbs. per sq. in. which will commence to move the diaphragm. As soon as the piston 30 is brought into action by movement of the vehicle, the pressure of 10 lbs. per sq. in. necessary to pass valve 63 is attained by the quantity of fuel displaced by the piston, which now further depresses the diaphragm 41 and supplies the outlet 70, its effective pressure dropping to the appropriate diaphragm-balancing pressure between 3 and 4 lbs. per sq. in. hereinbefore described.

Care must be exercised in the arrangement of the parts to ensure that no air pockets can be formed in any space between the inlet valve 23 and the outlet valve 63, as the resultant compressibility will introduce an error between the measured displacement of the piston and the actual displacement of fuel.

To set the indicator in correlation with the pump unit wedge position, the adjuster 56 is first unscrewed slightly less than is necessary to remove all slack from the cable 52 with the screw 108 fully extended as shown in FIGURE 3. The vehicle drive wheels are raised from the ground and driven for a short time to introduce fuel into the pump unit and displace unwanted air. The carburetor inlet connection pipe is then removed to connection 73 and the plug 74 replaced to seal the pump outlet 70. The engine is again started and the wheels driven, the engine fuel being now directly supplied from the vehicle pump and the diaphragm 41 in the chamber 5 being depressed by the action of piston 30 until the wedge 4 just prevents any movement of the piston. This condition corresponds to no consumption per mile, or infinite miles per gallon, and the adjusting screw 109 in the indicator end bracket 76 is now screwed in for approximately ¾″ so that the scale accurately registers the infinity mark previously described. The setting is thus completed and the connection at 70 and plug at 73 are replaced. Occasionally the setting may be checked by running free-wheel down a slope with the engine switched off until the indicator attains its maximum displacement, which should be reset to the infinity mark if necessary by adjustment of the screw 109.

What I claimed is:

1. A fuel consumption meter installation to determine the relationship between the fuel consumption and an output condition of an internal combustion engine installation, comprising fuel delivery means in flow cooperation with the fuel consumption line of said engine; means for driving said fuel delivery means in proportion to an output condition of said engine; control means to vary the output of said fuel delivery means; balancing means sensitive to a difference in the flow condition between said fuel delivery output and the fuel consumption flow to actuate said control means to maintain the fuel delivery output equal to said fuel consumption; and indicating means responsive to the setting of said control means.

2. A fuel consumption meter installation as claimed in claim 1 in which said fuel delivery means comprises a displacement pump.

3. A fuel consumption meter installation as claimed in claim 2 in which said displacement pump comprises interchangeable displacement assembly means of differing volumetric capacity.

4. A fuel consumption meter installation as claimed in claim 1 in which said fuel delivery means comprises variable displacement pump means, and said control means operates to vary the displacement of said pump means.

5. A fuel consumption meter installation as claimed in claim 1 in which said engine installation comprises a vehicle and said indicating means determines the relationship between the fuel consumption and distance being traveled by said vehicle.

References Cited in the file of this patent
UNITED STATES PATENTS

| | | |
|---|---|---|
| 1,451,064 | Dunajeff | Apr. 10, 1923 |
| 2,165,839 | Davis | July 11, 1939 |
| 2,250,125 | Chisholm | July 22, 1941 |